Patented Nov. 17, 1942

2,302,022

UNITED STATES PATENT OFFICE 2,302,022

PROCESS FOR SACCHARIFYING CELLULOSE

Mario Giordani, Rome, and Pietro Leone, Palermo, Italy; vested in the Alien Property Custodian No Drawing. Application March 7, 1939, Serial No. 260,336. In Italy March 16, 1938

1 Claim. (Cl. 127—37)

It is known that it is possible to obtain by hydrolysis from cellulose and from all wood substances, sugar solutions adapted to undergo various kinds of fermentations.

The processes which have up to now been proposed and applied to this end may sharply be divided into two classes, in one of which use is made of diluted solutions of mineral acids (usually sulphuric, sulphurous, hydrochloric acids, etc.) operating a high pressures and temperatures, the other class being based on the use of hyperconcentrated hydrochloric acid or concentrated sulphuric acid.

Under different operating conditions the said two processes have been used in different applications, which however are not free from difficulties and inconveniences resulting in low efficiency and high cost of operation. It is in fact easy to calculate from the following formula:

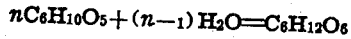

$$nC_6H_{10}O_5 + (n-1)H_2O = C_6H_{12}O_6$$

that from 100 parts in weight of free cellulose, or cellulose contained in the wood material employed, 111 parts of fermentable sugars are obtainable, and is also known that the degree of efficiency reached with various processes, both in the laboratory and more particularly in commercial plants, differs widely from said result. This without taking into account the additional quantity of fermentable sugar material due to pentosans.

In processes using diluted acids with high pressures and temperatures, a fair amount of the sugar produced by saccharifying is materially destroyed owing to the high temperature, or in any case becomes unusable owing to the simultaneous formation of products which are toxical for the ferments, as phenols, furfurol, etc.

An improvement in the use of diluted acids has been disclosed by the Scholler-Thornesch process, according to which the cellulosic material, is placed into a suitable autoclave (percolator) traversed by a circulating acid solution at a temperature of about 180° C.

The advantages of said process, which makes it possible to withdraw continuously the products of the saccharification from the action of the elevated temperature, are substantial. The efficiency of the Scholler process, reaches normally from 20 to 24 litres of alcohol (when the solution which has been obtained is subjected to alcoholic fermentation) for every 100 kilos of dried wood material. Such efficiency is however far lower than the theoretical efficiency, which on the average should be over 35 litres of alcohol; moreover said process is not free from difficulties relatively to the means for providing the required pressures and temperatures, and it produces fermentable solutions too diluted requiring a great amount of combustible for distilling the alcohol therefrom, and an extensive plant for the fermentation step.

The process based on the use of concentrated acids, although giving higher efficiencies, have not been widely applied owing to the costly special metals required in the plant, and owing also to the economic and technical difficulties that these processes imply.

When using concentrated hydrochloric acid, it has been found that the minimum concentration required for reaching a high saccharifying degree is 40 to 42% of hydrochloric acid, as the hydrochloric acid having a normal concentration has proved to possess little or no activity. This process has been realized by Bergius in an installation now in operation, in which the yield, it is said, for every 100 kilos of dry wood material, is 60 kilos of sugar, two thirds of which are transformable in alcohol.

The plant for carrying out the Bergius' process, is however costly, and requires extensive and difficult operating means, (the use of hydrocloric acid with that concentration, requiring closed containers operated at high pressures, the recovery of the acid being also difficult), while a considerable loss is caused by the portion of hydrochloric acid which is not recovered as well as the high operating expenses due to the difficulties of working the plant and to its rapid deterioration.

The processes which have been proposed when concentrated sulphuric acid is used are based on an acid concentrated to about 72%, experience having shown that greater concentrations destroy the cellulose by carbonising it, while concentrations lower than 72% give low efficiencies. Anyhow, the use of concentrated sulphuric acid has not been attempted in actual practice owing to the high consumption of this acid and owing to the difficulties encountered in recovering it, in spite of the large number of patents granted on this field.

According to the present invention, sulphuric acid is used, because said acid is undoubtedly the best available in large amounts for this purpose, because plants for its production are widespread in many places, and on account of its easier handling in cheaper installations.

The process according to the invention, includes the best possible conditions for reducing to a minimum the consumption of the acid required, and its principal characteristic resides in the previous transformation of cellulose, which is highly resistant to the action of concentrated acids, into hydro-cellulose which is less resistant to said action.

The process is further based on the high hydrolyzing power exerted by diluted sulphuric acid, at elevated temperature, in a short period of time, for the transformation of cellulose into hydro-cellulose, and on the easy saccharifying action which this latter possesses with respect to concentrated sulphuric acid.

The necessary conditions for the practical application of the process are the following:

Separation in two stages of the process, the first of which consists in treating the cellulosic material in autoclave with sulphuric acid diluted to 0.5 to 5 per cent, for a very short time (about 30 minutes) the second stage consisting in treating the mass obtained from said first stage, with concentrated sulphuric acid.

*Example.*—100 kilos of dry wood dust, are first treated with diluted sulphuric acid (about 1%) at a temperature of 135° to 150° C. for 15 minutes, the valve of the autoclave in which the operation is carried out being slightly open so as to eliminate therefrom the furfurol and other toxical volatile substances, thereupon the resulting mass is filterpressed. This mass, after drying, which now contains hydro-cellulose in lieu of cellulose, is mixed with about 120 kilos of strong sulphuric acid (concentration 80%) with mechanical agitation by adding said acid very slowly, and by cooling continuously with any suitable cooling means. The mass is then diluted with water to bring the acid concentration down to 25% and subsequently boiled for half an hour.

We claim:

In the process of saccharification of cellulose, either free or contained in wood and vegetable materials, by the use of first, diluted and afterward concentrated sulphuric acid, the steps which consist in subjecting the cellulosic material to a preliminary treatment for about 30 minutes in an autoclave in a diluted solution of sulphuric acid containing from .05 to 5 percent of sulphuric acid at a temperature ranging from 135° C. to 150° C., whereby to transform cellulose into hydrocellulose, subsequently treating the residual mass consisting of hydrocellulose and lignin obtained from said preliminary operation, with cold concentrated sulphuric acid having a concentration of at least 70%, suitably cooling the resulting mass for the purpose of preventing the rise of temperature due to the exothermic nature of the reaction, and finally diluting the mass with water and heating the same to 100° C.

MARIO GIORDANI.
PIETRO LEONE.